United States Patent [19]

Mashimo

[11] Patent Number: 5,132,957
[45] Date of Patent: Jul. 21, 1992

[54] INFORMATION SIGNAL RECORDING AND REPRODUCING SYSTEM CAPABLE OF RECORDING AN INFORMATION SIGNAL ON A MEDIUM HAVING A LIMITED RECORDING BAND WIDTH

[75] Inventor: Akira Mashimo, Tokorozawa, Japan
[73] Assignee: TEAC Corporation, Japan
[21] Appl. No.: 426,789
[22] Filed: Oct. 25, 1989

[30] Foreign Application Priority Data

Nov. 7, 1988 [JP] Japan ................ 63-281049
Nov. 8, 1988 [JP] Japan ................ 63-282069
Nov. 8, 1988 [JP] Japan ................ 63-282070

[51] Int. Cl.$^5$ ............... G11B 5/02; H04N 5/76; H03K 7/08
[52] U.S. Cl. ................... 369/59; 369/60; 360/24; 375/22
[58] Field of Search ............ 360/39, 40, 24; 369/59, 369/60; 375/22, 62, 122; 358/167

[56] References Cited

U.S. PATENT DOCUMENTS

| | | | |
|---|---|---|---|
| 4,000,511 | 12/1976 | Kenney | 358/167 |
| 4,045,812 | 8/1977 | Verhoeven et al. | 358/330 |
| 4,079,355 | 3/1978 | van der Gaag | 375/62 |
| 4,179,660 | 12/1979 | Zeis | 375/22 |
| 4,236,050 | 11/1980 | Winslow et al. | 369/47 |
| 4,495,474 | 1/1985 | Nishikawa et al. | 369/59 |
| 4,502,024 | 2/1985 | Nishikawa et al. | 375/22 |
| 4,713,802 | 12/1987 | Kobata et al. | 369/59 |
| 4,928,318 | 5/1990 | Ibe et al. | 455/608 |

*Primary Examiner*—Aristotelis Psitos
*Assistant Examiner*—Jefferson Evans
*Attorney, Agent, or Firm*—Andrus, Sceales, Starke & Sawall

[57] ABSTRACT

An information signal recording and reproducing system for recording and reproducing an information signal on and from a recording medium comprises a modulation circuit for modulating the information signal to form a modulated signal involving a number of pulses, a first frequency divider triggered responsive to a leading edge of the pulses in the modulated signal to produce a first frequency-divided signal having a frequency substantially lower than that of the modulated signal, a second frequency divider triggered responsive to a trailing edge of the pulses in the modulated signal to produce a second frequency-divided signal having a frequency substantially lower than that of the modulated signal, a recording device for recording the first and second frequency-divided signals on the recording medium, a reproducing device for detecting the first and second frequency-divided signals recorded on the recording medium to produce a first reproduced frequency-divided signal and a second reproduced frequency-divided signal, a synthesizing circuit supplied with the first and second reproduced frequency-divided signals to produce a synthetic modulated signal corresponding to the modulated signal by performing an exclusive-or operation of the first and second frequency-divided signals, and a demodulating circuit supplied with the synthetic modulated signal to produce a reproduced information signal.

8 Claims, 8 Drawing Sheets

INFORMATION SIGNAL RECORDING AND REPRODUCING SYSTEM CAPABLE OF RECORDING AN INFORMATION SIGNAL ON A MEDIUM HAVING A LIMITED RECORDING BAND WIDTH

BACKGROUND OF THE INVENTION

The present invention generally relates to recording and reproducing of information signals and more particularly to a system for recording and reproducing an information signal on and from a recording medium.

Conventionally, information signals having a wide frequency spectrum such as video signal are recorded on a recording medium such as optical disk or magnetic tape after frequency modulation or pulse width modulation. When recording such a video signal by frequency modulation, it is well known that a sufficiently high carrier frequency at least covering a frequency range corresponding to the white level of the picture has to be used. However, there is a limitation in the frequency which can be recorded on the recording medium and thus the carrier frequency has to be limited according to such an upper frequency limit of the recording medium. Associated therewith, the frequency band of the information signal is limited and the quality of the picture is deteriorated.

Figure 1:
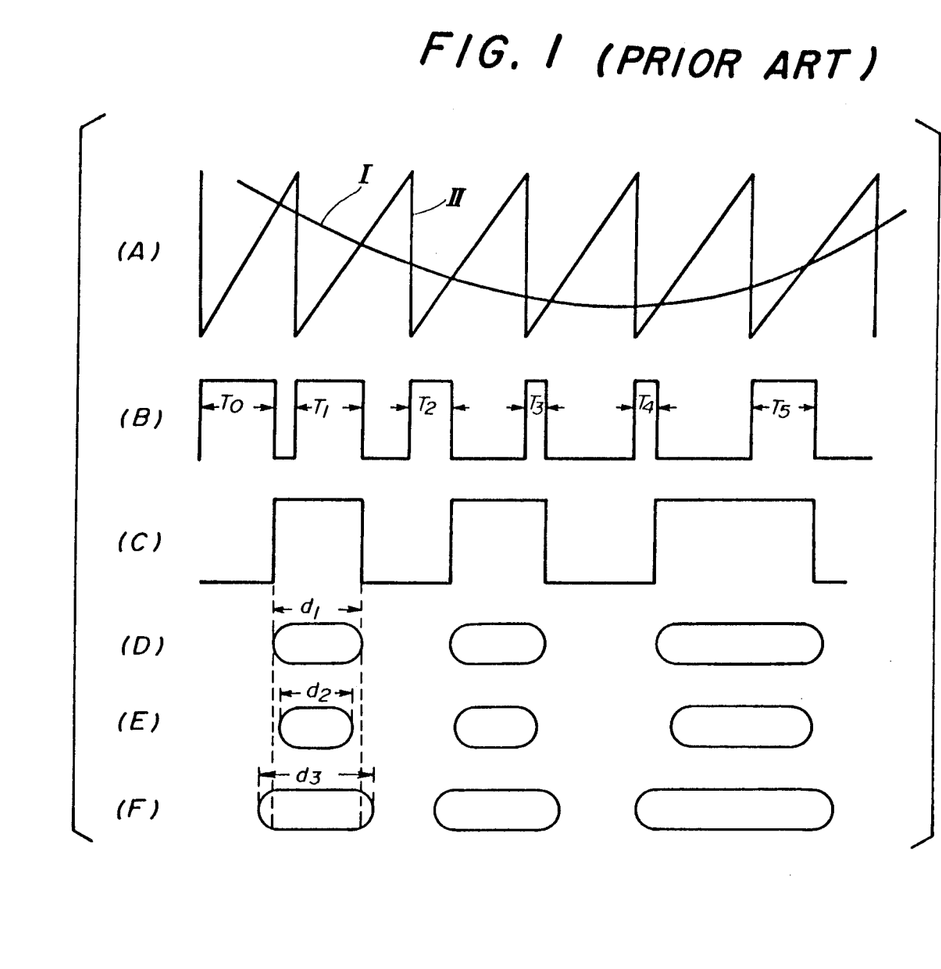

In the case of recording the video signal by the pulse width modulation, an incoming video signal is converted to a pulse width modulation (PWM) signal as shown in FIG. 1(A) in which a video signal I is compared with a sawtooth wave II and a PWM signal shown in FIG. 1(B) is obtained as a result of comparison. In this technique, as the leading edge of the PWM signal is always coincident to the trailing edge of the sawtooth wave II, it is possible to record and reproduce the information signal by using a frequency-divided signal shown in FIG. 1(C) which is frequency-divided to one-half the original frequency by performing triggering responsive to the trailing edge of the PWM signal of FIG. 1(B). In this case, one can record the information signal without problem even when the frequency of the sawtooth wave shown in FIG. 1(A) is doubled and the frequency spectrum of the video signal recorded on the recording medium can be increased substantially.

When recording the PWM signal on an optical disk, a laser beam is used for the recording such that the intensity of the laser beam is changed according to the frequency-divided signal shown in FIG. 1(C) and a row of pits are formed on the optical disk as shown in FIG. 1(D) in correspondence to the signal of FIG. 1(C).

When recording the PWM signal in a form of pits shown in FIG. 1(D), there arises a problem in that a width $d_1$ of the pit shown in FIG. 1(C) tends to be changed apparatus by apparatus as shown in FIGS. 1(D) and (E) when the beam spot of the laser beam used for recording is not controlled exactly at a uniform spot radius. In the case of FIG. 1(D), the pit width is reduced to $d_2$ which is smaller than $d_1$ while in the case of FIG. 1(E), the pit width is increased to $d_3$ which is larger than $d_1$. Note that in any of these cases, the width of the pit does not correspond to the PWM signal of FIG. 1(C). A similar problem occurs also at the time the information signal is reproduced when the beam spot of the laser beam used for reproducing is not controlled exactly. When such a variation of the beam spot occurs at the time of recording or reproducing, therefore, pulse widths $T_0, T_1, T_2, \ldots$ of the original PWM signal shown in FIG. 1(B) cannot be reproduced from the frequency-divided PWM signal of FIG. 1(C). In other words, the recording and reproducing of the wide spectrum video signal becomes no longer possible.

A same problem occurs also when the frequency-divided PWM signal is recorded on a magnetic tape as a result of variation of the state of contact between the magnetic head and the magnetic tape.

SUMMARY OF THE INVENTION

Accordingly, it is a general object of the present invention to provide a novel and useful information signal recording and reproducing system wherein the aforementioned problems are eliminated.

Another and more specific object of the present invention is to provide an information signal recording and reproducing system wherein an information signal having a wide frequency band can be recorded and reproduced on and from a recording medium.

Another object of the present invention is to provide an information signal recording and reproducing system wherein a pulse width of an information signal recorded on a recording medium with pulse width modulation can be reproduced precisely from the recording medium even in the case that there is a variation in the state of recording or reproducing, so that the recording and reproducing of the information signal having a wide frequency band can be performed with reliability.

Another object of the present invention is to provide an information signal recording and reproducing system for recording an information signal after a modulation performed under a constant amplitude on a recording medium and for reproducing the information signal from the recording medium after a corresponding demodulation, comprising a first frequency divider triggered responsive to a leading edge of a rectangular information signal formed in correspondence to the information signal subjected to said modulation to produce a first frequency-divided signal having a frequency which is one-half the frequency of the rectangular information signal, a second frequency divider triggered responsive to a trailing edge of the rectangular information signal to produce a second frequency-divided signal having a frequency one-half the frequency of the original rectangular information signal, and a synthesizing circuit supplied with said first and second frequency-divided signals for producing a synthetic rectangular signal by performing an exclusive-or operation of said first and second frequency-divided signals, wherein said system records the information signal on the recording medium by recording said first and second frequency-divided signals and reproduces the original information signal after a demodulation of said synthetic rectangular signal. According to the present invention, the recording and reproducing of the information signal is made by recording and reproducing the first and second frequency-divided signals. As a result, the frequency of the carrier used for the modulation, when the information signal is subjected to frequency modulation for recording, can be set twice as large as the frequency of the carrier used in the conventional case and the frequency band of the information signal can be increased significantly. Further, the system can provide the synthetic rectangular signal in a form of a reproduced PWM signal when the modulation of the information signal is made by the pulse width modulation. In this case, as the reproduced PWM information signal is obtained as a result of the exclusive-or operation of the first and second frequency-divided signals, the pulse width of each of the pulses in the reproduced PWM information signal is always coincident to that of the PWM information signal used for recording. In other words, the original PWM information signal is reproduced reliably. As a result, recording and reproducing of the information signal having a wide frequency range is achieved with reliability regardless to the variation in the state of recording or reproducing.

Other objects and further features of the present invention will become apparent from the following detailed descriptions on the preferred embodiments when read in conjunction with attached drawings.

BRIEF DESCRIPTION OF THE DRAWINGS

FIGS. 1(A)-(F) are diagrams for explaining operation and problem pertinent to a prior art information signal recording and reproducing system;

FIGS. 3(D)-(D) are wave form diagrams showing an operation of the system of FIG. 2;

FIGS. 5(A)-(O) are diagrams for explaining the operation of the system of FIG. 4;

FIGS. 6(A)-(D) are diagrams for explaining problems associated with the system of FIG. 2;

FIGS. 8(A)-(D) and FIGS. 9(A)-(B) are diagrams for explaining the operation of the system of FIG. 7.

DETAILED DESCRIPTION

Figure 2:
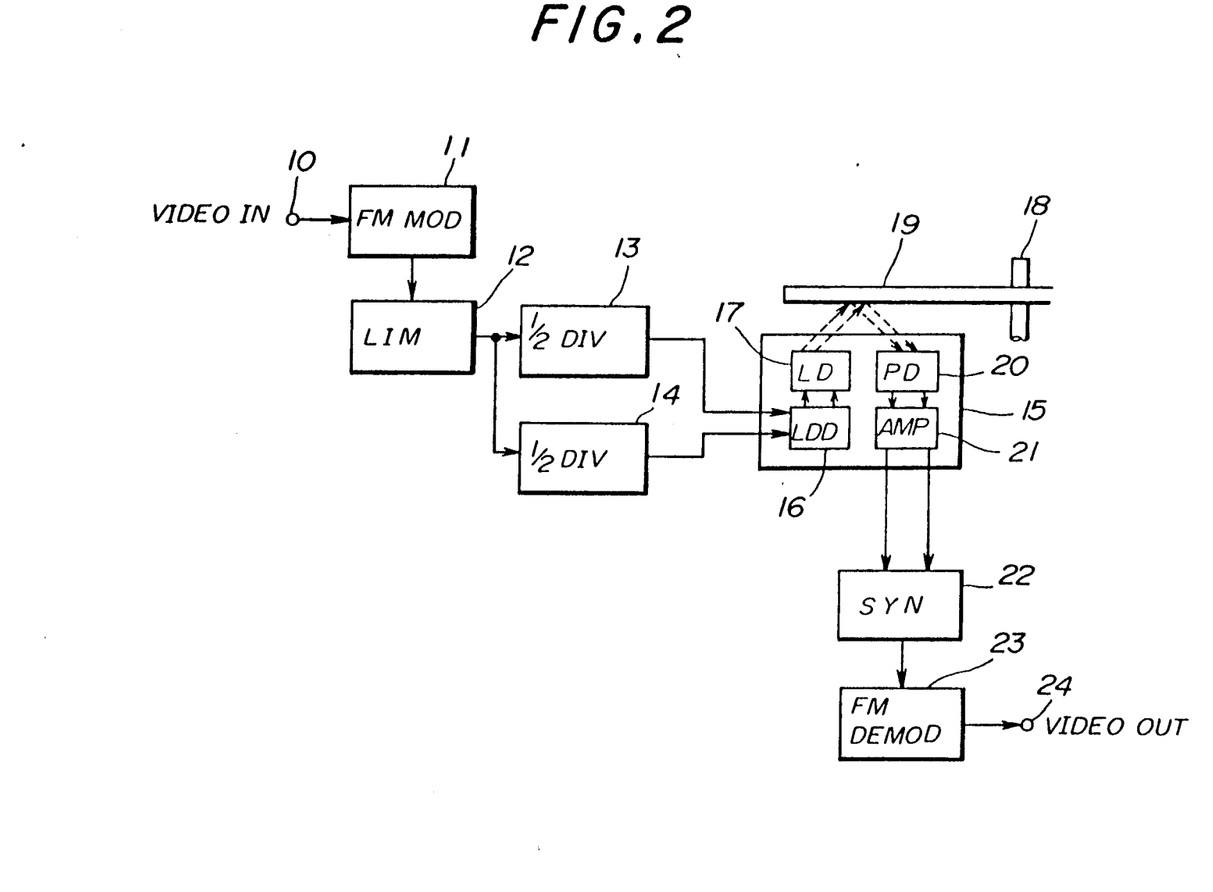
FIG. 2 is a block diagram showing a first embodiment of the information signal recording and reproducing system according to the present invention.

FIG. 2 shows a block diagram of an optical disk recording and reproducing apparatus according to a first embodiment of the present invention.

Figure 3:
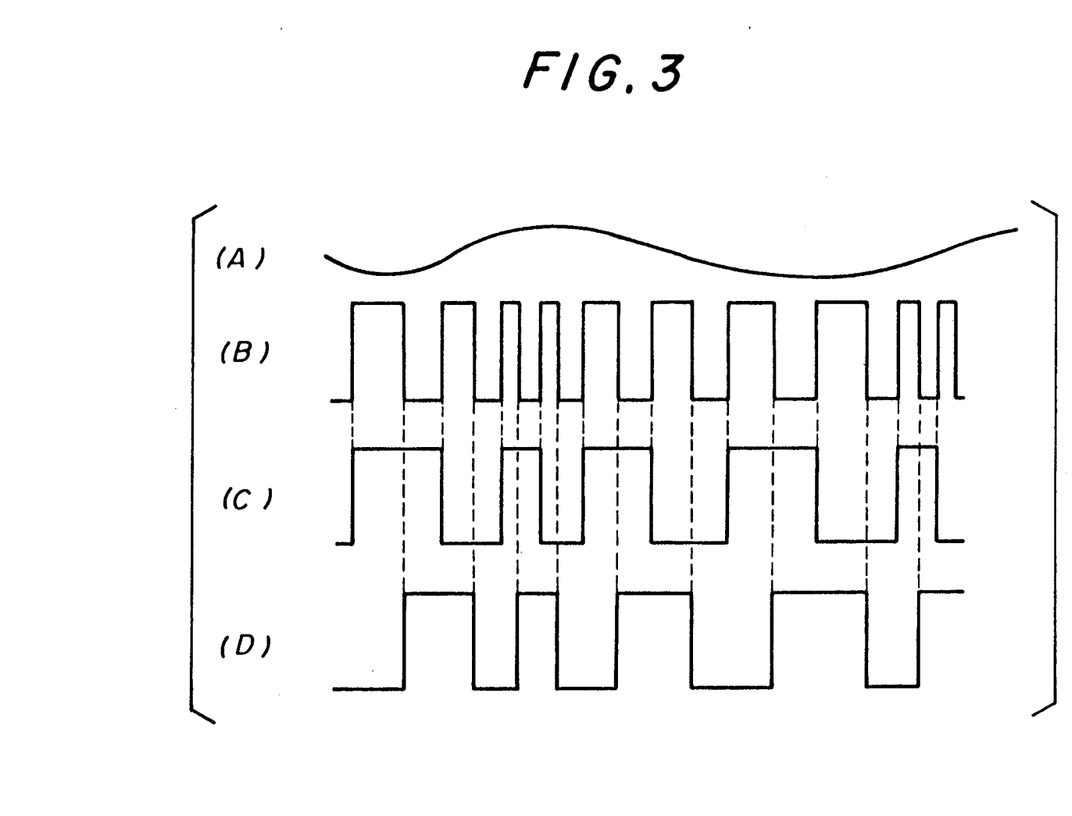

Referring to FIG. 2, a video signal having a waveform shown in FIG. 3(A) is applied to an input terminal 10 for recording. The video signal is then supplied to a modulator 11 for frequency modulation. After the frequency modulation, an FM video signal obtained as a result of the frequency modulation of the video signal is passed through a limiter 12 where an upper part and a lower part of the FM video signal is clipped and a rectangular signal shown in FIG. 3(B) is obtained.

The rectangular signal thus obtained is then supplied to a frequency divider 13 on the one hand and to another frequency divider 14 on the other hand. The frequency divider 13 is a T-type flip-flop operating responsive to a leading edge of an input signal and produces a first frequency-divided signal shown in FIG. 3(C) having a frequency which is one-half of that of the input rectangular signal. The frequency divider 14, on the other hand, is a T-type flip-flop operating responsive to a trailing edge of the input signal and produces a second frequency-divided signal shown in FIG. 3(D) having a frequency which is one-half the frequency of the input rectangular signal.

The first and second frequency-divided signals are then supplied to a laser diode driver (LDD) 16 provided on an optical base 15 and the LDD 16 drives the laser diodes (not shown) in a laser diode assembly (LD) 17 such that a first and second laser beams are produced with an intensity corresponding to the level of the first and second frequency-divided signals. The first and second laser beams are irradiated on an optical disk 19 revolving about a rotary axis 18 at a first radial position and a second radial position which is adjacent to the first radial position, respectively. As a result, pits are formed on the disk 19 responsive to the level of the first and second frequency-divided signals along a pair of tracks.

When reproducing the information signal from the disk, the LDD 16 drives the laser diodes such that the first and second laser beams have a constant intensity. As a result of reflection of the first and second laser beams at a recording surface of the disk 19, a first and second reflection beams are formed and these reflection beams are detected by the photodiodes (not shown) in a photodiode assembly (PD) 20. Thus, a first reproduced frequency-divided signal and a second reproduced frequency-divided signal as shown in FIGS. 3(C) and (D) are obtained in correspondence to the existence or absence of the pit and these reproduced frequency-divided signals are supplied to a synthesizing circuit 22 after amplification in a head amplifier 21.

The synthesizing circuit 22 is an exclusive-or circuit and performs an exclusive-or operation based on the first and second reproduced frequency-divided signals shown in FIGS. 3(C) and (D). Thereby, a synthetic FM rectangular signal having a waveform identical to that of FIG. 2(B) is obtained as a result of the operation. This synthetic FM rectangular signal is then demodulated in a demodulator 23 performing a frequency demodulation and the original video signal shown in FIG. 3(A) is obtained at a terminal 24.

According to the foregoing construction, the carrier frequency of the FM video signal can be set two times as large as the conventional case and the frequency band of the video signal to be recorded and reproduced can be almost doubled as compared to the prior art system.

Although the foregoing embodiment is described as a recording and reproducing system for the optical disk, the present invention is also applicable to a system using a magnetic tape. In this case, four magnetic heads are used in which a pair of magnetic heads are provided on each of first and second head positions which are separated by 180 degrees on a rotary drum for recording and reproducing the first and second frequency-divided signals.

Next, a second embodiment of the optical disk recording and reproducing system of the present invention will be described with reference to FIG. 4. In the drawing, these parts corresponding to the parts already described with reference to the preceding drawings are given identical reference numerals and the description thereof will be omitted.

Figure 4:
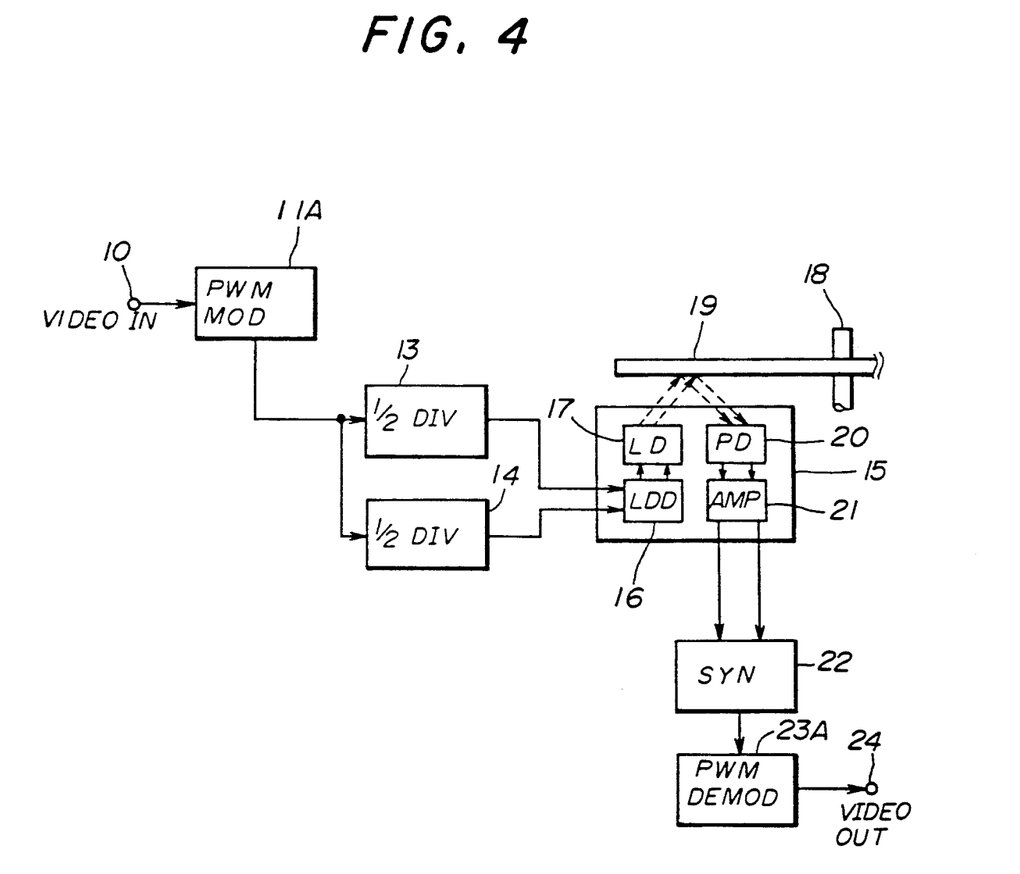
FIG. 4 is a block diagram showing a second embodiment of the present invention.
Figure 5:
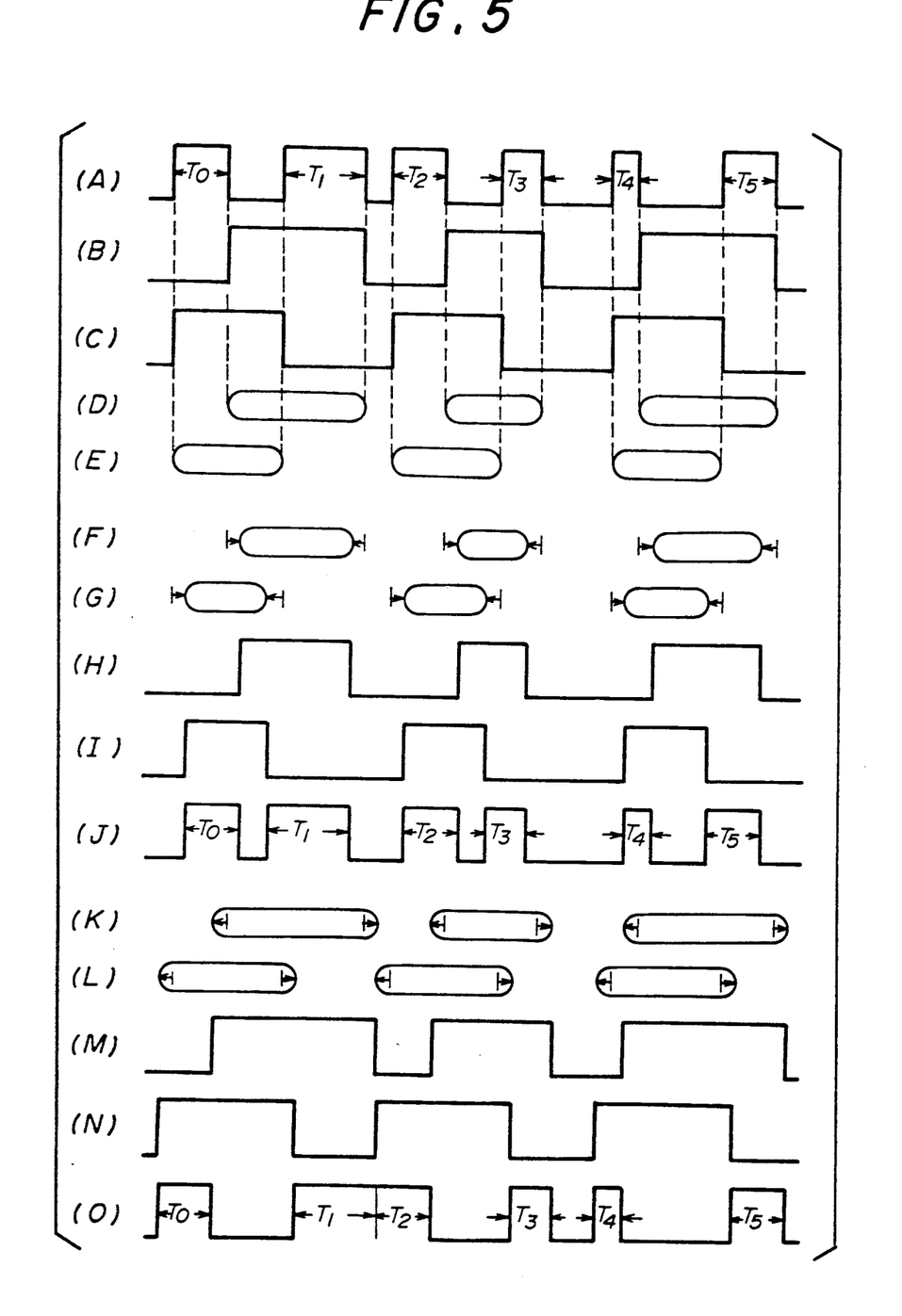

Referring to FIG. 4, the video signal applied to the input terminal 10 is supplied to a PWM modulator 11A where the video signal is compared with a sawtooth wave as already described in relation to FIG. 1(A) and a PWM signal shown in FIG. 5(A) is obtained. The PWM signal is then supplied to the first and second frequency dividers 13 and 14 where a first frequency-divided signal shown in FIG. 5(B) and a second frequency-divided signal shown in FIG. 5(C) are produced. The first and second frequency-divided signals are then supplied to the LDD 16 in the optical base 15 similarly to the first embodiment whereby a first row of pits shown in FIG. 5(D) are formed in correspondence to the first frequency-divided signal as a first track and a second row of pits shown in FIG. 5(E) are formed in correspondence to the second frequency-divided signal as a second track. In FIGS. 5(D) and (E), the pits are illustrated as if they are formed by a laser beam having a uniform beam spot diameter. When the diameter of the beam is changed, the width of the pit is reduced as shown in FIGS. 5(F) and (G) or increased as shown in FIGS. 5(K) and (L). The small arrows in these drawings indicate the deviation of the pit size from the normal one shown in FIGS. 5(D) and (E).

When reproducing, the LDD 16 produces the first and second laser beams having a constant intensity similarly to the first embodiment and as a result of reflection of the laser beams at the optical disk 19, the PD 20 reproduces a first frequency-divided signal and a second frequency-divided signal as shown in FIGS. 5(H) and (I) or as shown in FIGS. 5(M) and (N). These reproduced signals are amplified in the amplifier 21 and supplied to the synthesizing circuit 22. Note that the signals shown in FIGS. 5(H) and (I) are the reproduced signals corresponding to the pits of FIGS. 5(D) and (E) and the signals shown in FIGS. 5(M) and (N) are the reproduced signals corresponding to the pits of FIGS. 5(K) and (L).

Similarly to the foregoing embodiment, the synthesizing circuit 22 is an exclusive-or circuit and produces a synthetic PWM signal shown in FIG. 5(J) or in FIG. 5(O) as a result of the exclusive-or operation of the reproduced first and second frequency-divided signals shown in FIGS. 5(H) and (I) or in FIGS. 5(M) and (N). Note that the pulse width $T_0-T_5$ of the pulses in the PWM signal of FIG. 5(A) coincides exactly with the corresponding width $T_0-T_5$ of the pulses in the synthetic PWM signal of FIG. 5(J) or FIG. 5(O) in spite of the fact that the width of the pits are decreased or increased as a result of the variation of the diameter of the laser beam at the time of recording as already described. Of course, the width of the pulses in the synthetic PWM signal obtained from the track shown in FIGS. 5(D) and (E) coincides exactly with the width of the pulses in the original PWM signal of FIG. 5(A).

The PWM signal of FIG. 5(J) or FIG. 5(O) is then supplied to a PWM demodulator 23A which may be a low pass filter and the demodulator 23A converts the PWM signal to the original video signal which is then supplied to the output terminal 24. Note that, in the demodulation of the synthetic PWM signal, the demodulation is performed correctly even when the phase of the pulses in the PWM signal is displaced, as long as the width of the pulse is identical to the pulses in the original PWM signal.

Similarly to the first embodiment, the frequency range or band of the PWM video signal can be increased two times as large as the conventional case as a result of use of the first and second frequency-divided signals which have a frequency one-half the frequency of the PWM video signal. In other words, the frequency band of the video signal to be recorded and reproduced can be almost doubled as compared to the prior art system.

Next, an information signal recording and reproducing system according to a third embodiment of the present invention will be described.

Referring to FIGS. 3(C) and (D) showing the first and second frequency-divided signals obtained by the system of FIG. 2, it is obvious that a 90 degree phase difference is maintained between the first and second frequency-divided signals as long as the recording and reproducing are performed by a same apparatus. The waves shown in FIGS. 6(A) and (B) correspond to the waves shown in FIGS. 3(C) and (D).

Figure 6:
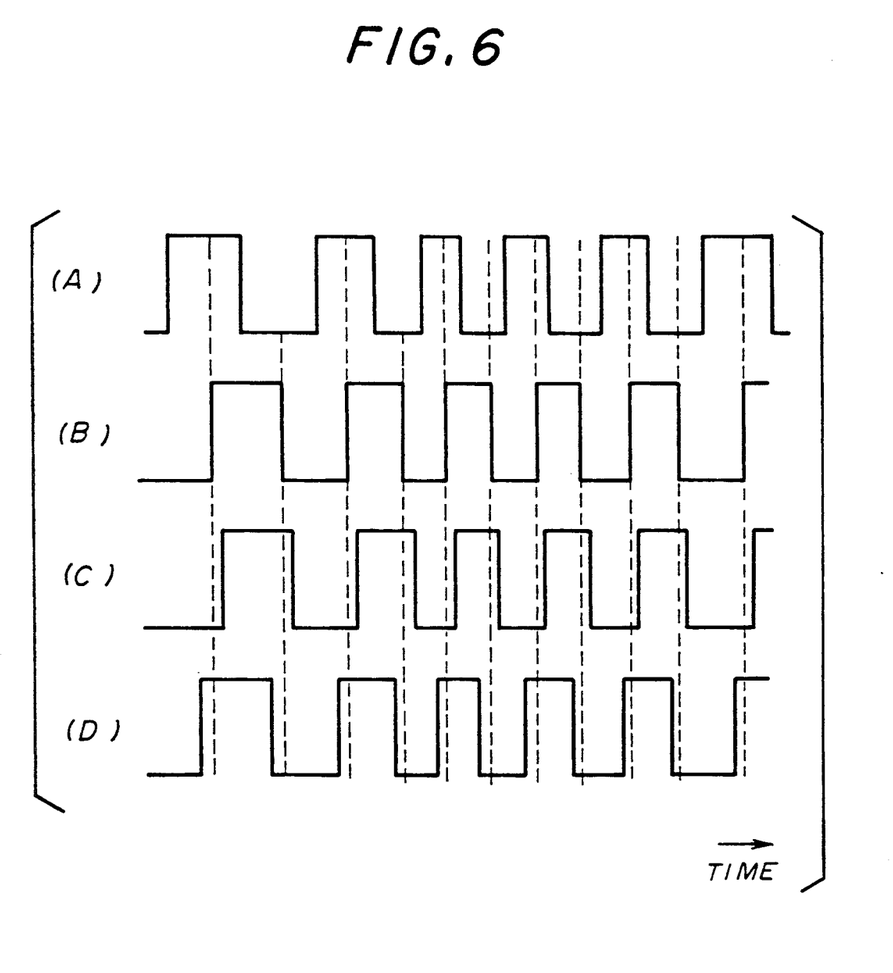

In the case of carrying out the recording and reproducing by different apparatuses, however, there arises a case in which the relative phase difference between the first reproduced frequency-divided signal and the second reproduced frequency-divided signal is changed from that of FIGS. 6(A) and (B) as shown in FIGS. 6(C) and (D), in which the FIG. 6(C) shows a case where the second reproduced frequency-divided signal is lagged relative to the first frequency-divided signal and FIG. 6(D) shows a case where the second reproduced frequency-divided signal is advanced relative to the first frequency-divided signal. When such a relative phase difference exists, the reproduced information signal obtained by the demodulation of the synthetic FM rectangular signal is distorted. The present embodiment has its object to eliminate such a problem of distortion and to realize the compatibility between the individual recording and reproducing apparatuses. In the following description, these parts already described are given identical reference numerals and the description thereof will be omitted.

Figure 7:
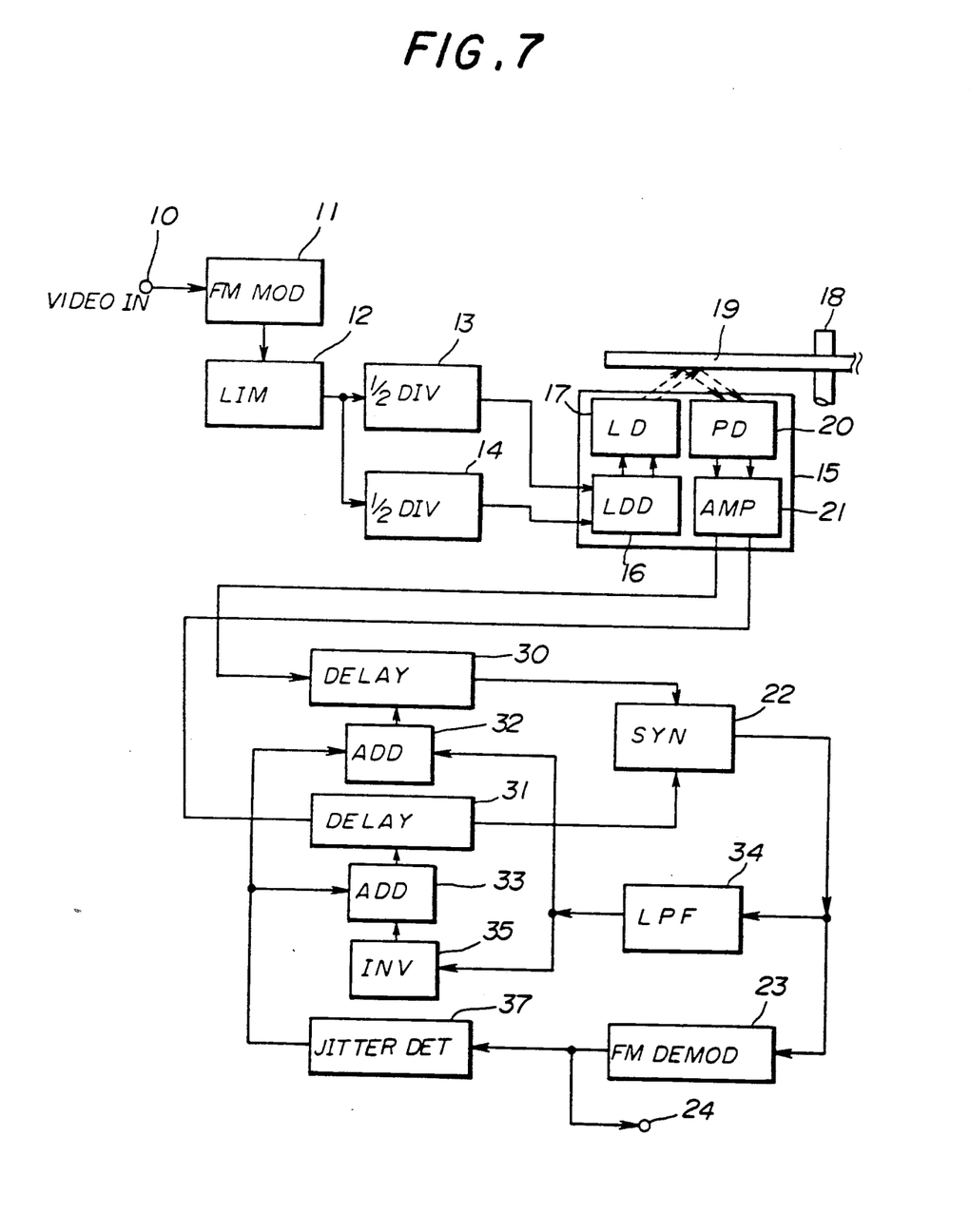
FIG. 7 is a block diagram showing a third embodiment of the present invention.

FIG. 7 shows a block diagram of the third embodiment. Referring to the drawing, the video signal applied to the input terminal 10 is recorded on the disk 19 in a form of pits forming a pair of tracks corresponding to the first frequency-divided signal and the second frequency-divided signal similarly to the first embodiment.

Figure 8:
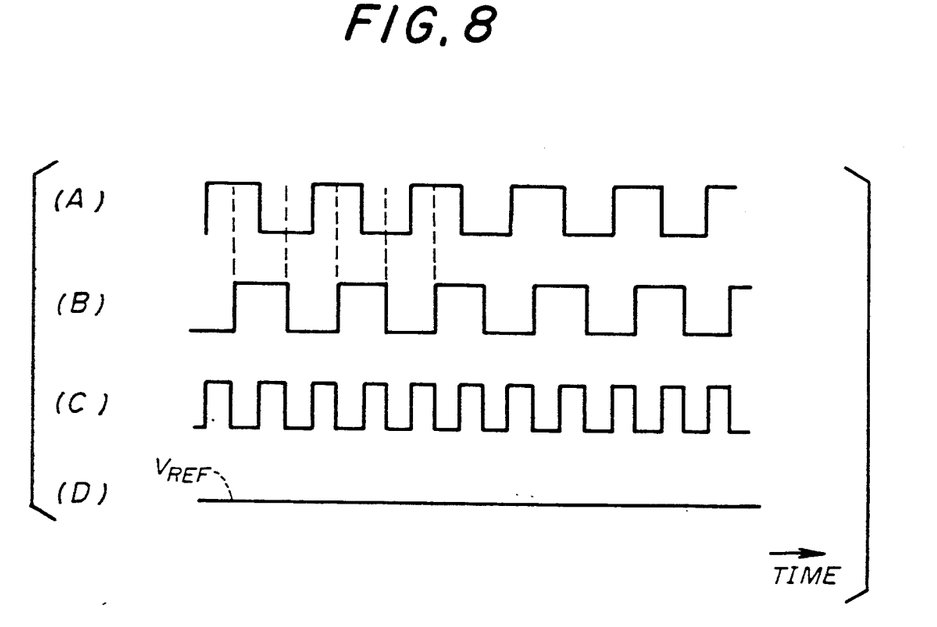
Figure 9:
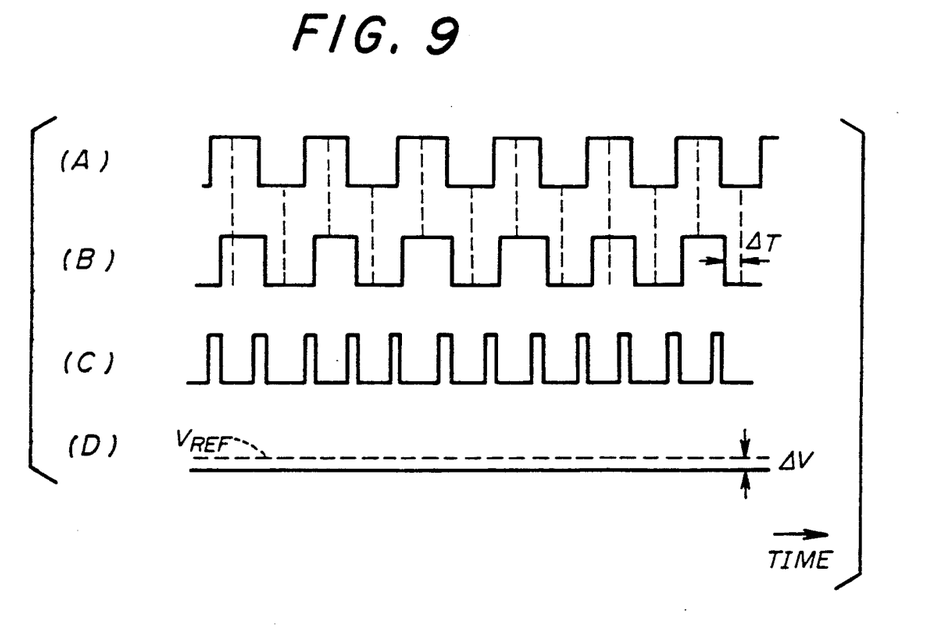

At the time of reproduction, the LDD 16 irradiates the recording surface of the disk 19 by the first and second laser beams having a constant intensity similarly to the foregoing case and the reflected beams are converted to the first and second reproduced frequency-divided signals in corresponding to the pits on the tracks as shown in FIGS. 8(A) and (B) or FIGS. 9(A) and (B). FIGS. 8(A) and (B) show the case where there is no lagging or leading in the signals and FIGS. 9(A) and (B) show a case where there exists such relative lagging or leading. These first and second reproduced frequency-divided signals are then amplified by the head amplifier 21 and supplied to a first and second variable delay liens 30 and 31 respectively, where the they are delayed by an amount specified by a control voltage supplied to the delay lines via an adder circuit 32 or another adder circuit 33.

After passing through the delay line 30 or delay line 31, the first and second reproduced frequency-divided signals are supplied to the foregoing synthesizing circuit 22. After the exclusive-or operation, the synthesizing circuit 22 produces a synthetic FM rectangular signal as shown in FIG. 8(C) or FIG. 9(C). Further, the synthetic FM rectangular signal is supplied to a low pass filter 34 and to the demodulator 23 for FM demodulation.

The low pass filter 34 averages the synthetic FM rectangular signal supplied thereto by integration and obtains an average voltage representing the average level of the synthetic FM rectangular signal shown in FIG. 8(C) or FIG. 9(C). When the first and second reproduced frequency-divided signals are separated each other in phase by exactly 90 degrees as shown in FIGS. 8(A) and (B), the obtained average voltage assumes a reference voltage level ($V_{REF}$) as shown in FIG. 8(D). In other words, $V_{REF}$ is set equal to the foregoing average voltage level corresponding to the case of FIG. 8(C) where the synthetic FM rectangular signal has a 50% duty cycle. When the second reproduced frequency-divided signal is advanced relative to the first by $\Delta T$ as shown in FIGS. 9(A) and (B), on the other hand, the average voltage level obtained by averaging the signal of FIG. 9(C) becomes lower than $V_{REF}$ as shown in FIG. 9(D). The low pass filter 34 then produces a phase error voltage $\Delta V$ which is a voltage difference between the obtained average voltage and $V_{REF}$ and supplies this $\Delta V$ to the adder circuit 32 directly on the one hand and to the adder circuit 33 after polarity inversion in an inverter 35.

The demodulator 23 reproduces the original video signal by the demodulation of the synthetic FM signal and the reproduced video signal is supplied to the output terminal 24. At the same time, the synthetic FM signal is supplied to a jitter detector 37. The jitter detector 37 compares the horizontal synchronizing signal of the video signal with a reference horizontal synchronizing signal and produces a jitter correction voltage which is then supplied to the adder circuits 32 and 33.

In the adder circuit 32, the control voltage is produced as a sum of the phase error voltage and the foregoing jitter correction voltage, and the control voltage thus produced is supplied to the first variable delay line 30. In the adder circuit 33, on the other hand, the control voltage is produced as a sum of the phase error voltage having the foregoing inverted polarity and the jitter correction voltage, and the control voltage is supplied to the second variable delay line 31.

In the case of FIG. 8(D) where there is no phase error voltage, the variable delay lines 30 and 31 perform only the jitter correction. In the case of FIG. 9(D), on the other hand, the variable delay line 30 decreases the amount of delay according to the phase error voltage $-\Delta V$ while the variable delay line 31 increases the amount of delay and the phase difference between the first and second reproduced frequency-divided signals is maintained at 90 degrees. As a result of the foregoing phase correction, the synthetic FM rectangular signal resumes the 50% duty cycle and the distortion in the reproduced video signal is eliminated. Further, the variable delay lines 30 and 31 perform the jitter correction at the same time. Thus, according to the system of FIG. 7, the phase correction and jitter correction are performed simultaneously by a simple circuit construction. Further, it should be noted that the phase correction may be performed by changing the phase of only one of the first and second reproduced frequency-divided signals.

As described heretofore, one can resume the 50% duty cycle for the synthetic FM signal by changing the delay of at least one of the first and second frequency-divided signals whenever the duty cycle of the synthetic FM signal is deviated from 50%. As a result, distortion of the reproduced video signal associated with the use of different apparatuses for the recording and reproducing is successfully eliminated.

Further, the present invention is not limited to these embodiments but various variations and modifications may be made without departing from the scope of the invention.

What is claimed is:

1. An information signal recording and reproducing system for recording and reproducing an information signal on and from a recording medium, comprising:
   modulation means for modulating the information signal to form a modulated signal comprising a number of pulses;
   first frequency divider means triggered responsive to a leading edge of the pulses in the modulated signal to produce a first frequency-divided signal having a frequency substantially lower than that of said modulated signal;
   second frequency divider means triggered responsive to a trailing edge of the pulses in the modulated signal to produce a second frequency-divided signal having a frequency substantially lower than that of said modulated signal;
   recording means for recording the first and second frequency-divided signals on the recording medium;
   reproducing means for detecting the first and second frequency-divided signals recorded on the recording medium to produce a first reproduced frequency-divided signal and a second reproduced frequency-divided signal;
   synthesizing means supplied with said first and second reproduced frequency-divided signals to produce a synthetic modulated signal corresponding to the modulated signal by performing an exclusive-or operation on said first and second frequency-divided signals; and
   demodulating means supplied with said synthetic modulated signal to produce a reproduced information signal.

2. A system as claimed in claim 1 in which said modulation means comprises a frequency modulator for applying a frequency modulation to the information signal and a limiter for clipping a high level and a low level of the information signal thus applied with the frequency modulation to form said modulated signal, and said demodulating means comprises a frequency demodulator.

3. A system as claimed in claim 2 further comprising variable delay means for delaying at least one of the first reproduced frequency-divided signal and the second reproduced frequency-divided signal by an amount specified by a control signal, and control means supplied with the synthetic modulated signal for producing the control signal such that said synthetic modulated signal maintains a 50% duty cycle.

4. A system as claimed in claim 3 in which said control means produces the control signal such that the control signal advances the phase of the first reproduced frequency-divided signal with reference to the second reproduced frequency-divided signal when the synthetic modulated signal has a duty cycle smaller than 50%.

5. A system as claimed in claim 3 in which said control means produces the control signal such that the control signal delays the phase of the second reproduced frequency-divided signal with reference to the first reproduced frequency-divided signal when the synthetic modulated signal has a duty cycle larger than 50%.

6. A system as claimed in claim 3 in which said variable delay means comprises a first variable delay circuit for delaying the first reproduced frequency-divided signal by a first delay time specified by a first control signal, and a second variable delay circuit for delaying the second reproduced frequency-divided signal by a second delay time specified by a second control signal, and said control means comprises an averaging circuit supplied with said synthetic modulated signal to produce an average voltage of the synthetic modulated signal, a first control circuit supplied with the average voltage from the averaging circuit for producing the first control voltage responsive to the average voltage and for supplying the first control voltage to said first delay circuit, an inverter circuit supplied with the average voltage from the averaging circuit to produce an inverted average voltage having a polarity inverted with respective to that of the average voltage, and a second control circuit supplied with the inverted average voltage for producing the second control voltage responsive to the inverted average voltage and for supplying the second control voltage to said second variable delay circuit.

7. A system as claimed in claim 6 further comprising a jitter detection circuit supplied with the reproduced information signal from the demodulating means for producing a jitter detection signal indicative of a jitter in the reproduced information signal and supplying the jitter detection signal to the first and second control circuit, said first control circuit performing an addition of the average voltage and the jitter detection signal and producing the first control signal as a sum of the average voltage and the jitter detection signal, and said second control circuit performing an addition of the inverted average voltage and the jitter detection signal and producing the second control signal as a sum of the inverted average voltage and the jitter detection signal.

8. A system as claimed in claim 1 in which said modulation means comprises a pulse width modulator and said demodulating means comprises a pulse width demodulator.

* * * * *